US012199242B2

(12) United States Patent
Wu et al.

(10) Patent No.: US 12,199,242 B2
(45) Date of Patent: Jan. 14, 2025

(54) ELECTROLYTE SOLUTION, SECONDARY BATTERY, BATTERY MODULE, BATTERY PACK AND ELECTRIC DEVICE

(71) Applicant: CONTEMPORARY AMPEREX TECHNOLOGY (HONG KONG) LIMITED, Hong Kong (CN)

(72) Inventors: Zeli Wu, Ningde (CN); Changlong Han, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 282 days.

(21) Appl. No.: 17/822,079

(22) Filed: Aug. 24, 2022

(65) Prior Publication Data

US 2023/0043895 A1 Feb. 9, 2023

Related U.S. Application Data

(63) Continuation of application No. PCT/CN2021/107669, filed on Jul. 21, 2021.

(51) Int. Cl.
| | |
|---|---|
| H01M 4/505 | (2010.01) |
| H01M 4/525 | (2010.01) |
| H01M 10/0525 | (2010.01) |
| H01M 10/0567 | (2010.01) |
| H01M 10/0569 | (2010.01) |
| H01M 4/02 | (2006.01) |

(52) U.S. Cl.
CPC ....... *H01M 10/0567* (2013.01); *H01M 4/505* (2013.01); *H01M 4/525* (2013.01); *H01M 10/0569* (2013.01); *H01M 2004/021* (2013.01); *H01M 2004/028* (2013.01); *H01M 10/0525* (2013.01); *H01M 2220/20* (2013.01); *H01M 2300/0025* (2013.01)

(58) Field of Classification Search
None
See application file for complete search history.

(56) References Cited

U.S. PATENT DOCUMENTS

| | | | | |
|---|---|---|---|---|
| 2009/0242849 A1* | 10/2009 | Sudoh | ................... | C01B 32/205 |
| | | | | 252/502 |
| 2015/0171469 A1 | 6/2015 | Kourtakis et al. | | |
| 2018/0191033 A1* | 7/2018 | Wessells | ............. | H01M 10/056 |
| 2019/0109347 A1 | 4/2019 | Wessells et al. | | |

FOREIGN PATENT DOCUMENTS

| | | | | |
|---|---|---|---|---|
| CN | 102544598 A | 7/2012 | | |
| CN | 104541388 A | 4/2015 | | |
| CN | 111129585 A | 5/2020 | | |
| CN | 111200164 A | 5/2020 | | |
| CN | 111525190 A | 8/2020 | | |
| EP | 3540824 A1 | 9/2019 | | |
| JP | 2002110237 A | 4/2002 | | |
| JP | 2013530488 A | 7/2013 | | |
| JP | 2018147878 A | 9/2018 | | |
| KR | 20020014195 A | 2/2002 | | |
| KR | 20160144757 A | * 12/2016 | ........ | H01M 10/0569 |
| WO | 2017149204 A2 | 9/2017 | | |

OTHER PUBLICATIONS

Binhua Huang, Dongqing Liu, Lihan Zhang, Kun Qian, Kai Zhou, Xingke Cai, Feiyu Kang, Baohua Li. An Efficient Synthetic Method to Prepare High-Performance Ni-rich LiNi0.8Co0.1Mn0.1O2 for Lithium-Ion Batteries, ACS Appl. Energy Mater. 2019, 2, 7403-7411.*

The first office action received in the corresponding Chinese application 202180076040.2, mailed on Apr. 16, 2024.
Decision to Grant a Patent received in the corresponding Japanese application 2022-552905, mailed on Mar. 19, 2024.
Extended European search report received in the corresponding European application 21926054.4, mailed on Sep. 1, 2023.
Notice of Reasons for Refusal received in the corresponding Japanese application 2022-552905, mailed on Oct. 24, 2023.
International Search Report and Written Opinion received in PCT Application PCT/CN2021/107669 on Mar. 28, 2022.
Request for the Submission of an Opinion received in the corresponding Korean application 10-2022-7031024, mailed on Oct. 2, 2024.

* cited by examiner

*Primary Examiner* — Carlos Barcena
(74) *Attorney, Agent, or Firm* — Kilpatrick Townsend & Stockton LLP

(57) ABSTRACT

Various embodiments provide an electrolyte solution, a secondary battery, a battery module, a battery pack and an electric device. In those embodiments, the electrolyte solution includes an electrolyte, a solvent and an additive, the additive including sodium hydrosulfite. Various embodiments improve an overall performance of the secondary battery, for example, initial DCR, storage gas production, a rate performance, or the like.

13 Claims, 3 Drawing Sheets

ELECTROLYTE SOLUTION, SECONDARY BATTERY, BATTERY MODULE, BATTERY PACK AND ELECTRIC DEVICE

CROSS-REFERENCE TO RELATED APPLICATIONS

The present application is a continuation of International Application PCT/CN2021/107669, filed Jul. 21, 2021 and entitled "ELECTROLYTE SOLUTION, SECONDARY BATTERY, BATTERY MODULE, BATTERY PACK AND ELECTRIC DEVICE", the entire content of which is incorporated herein by its reference.

TECHNICAL FIELD

The present disclosure relates to the field of lithium battery technologies, and particularly to an electrolyte solution, a secondary battery, a battery module, a battery pack and an electric device.

BACKGROUND ART

In recent years, as secondary batteries have a more and more extensive application range, the secondary batteries are widely applied to energy storage power systems, such as hydraulic power stations, thermal power stations, wind power stations, solar power stations, or the like, and to a plurality of fields, such as electric tools, electric bicycles, electric motorcycles, electric automobiles, military equipment, aerospace, or the like. Due to a great development of the secondary battery, higher requirements are also put forward for initial DCR, storage gas production, a rate performance, or the like, of the secondary battery.

However, an existing positive material (particularly a ternary material) of the secondary battery may undergo a side reaction, such as oxygen release, or the like, at a high temperature or high voltage due to instability thereof, thus seriously influencing a life of a lithium battery. Therefore, a positive electrode is required to be further protected, and the initial DCR, high-temperature storage gas production and rate performance of the battery need to be improved.

SUMMARY

The present application is made in view of the above problem, and an object thereof is to provide an electrolyte solution to further improve an overall performance of a secondary battery (for example, reduce initial DCR and storage gas production, improve a rate performance, or the like).

In order to achieve the above object, the present application provides an electrolyte solution, a secondary battery, a battery module, a battery pack and an electric device.

A first aspect of the present application provides an electrolyte solution, including an electrolyte, a solvent and an additive, the additive including sodium hydrosulfite.

Thus, in the present application, the sodium hydrosulfite is used as the additive, an interface film may be formed by the sodium hydrosulfite on surfaces of a positive electrode and a negative electrode in charging and discharging processes of the lithium secondary battery, and the formed interface film has a technical effect of lower resistance, thus reducing the initial DCR and storage gas production of the battery, and improving the rate performance.

In any embodiment, the sodium hydrosulfite has a mass percentage greater than 0 and less than or equal to 0.5% in the electrolyte solution; optionally, the sodium hydrosulfite has a mass percentage of 0.2%-0.4% in the electrolyte solution; further optionally, the sodium hydrosulfite has a mass percentage of 0.25%-0.35% in the electrolyte solution. Thus, by limiting the quantity of the sodium hydrosulfite additive within the above range, the secondary battery may have low initial DCR, low high-temperature storage gas production, and an excellent discharge rate performance.

In any embodiment, the additive further includes one or a combination of more of 1,3-propane sultone, fluoroethylene carbonate, and ethylene sulfate. Thus, various performances of the secondary battery are further improved by a synergistic effect between the sodium hydrosulfite and one or more of the 1,3-propane sultone and the fluoroethylene carbonate.

In any embodiment, the additive has a total mass percentage greater than 0 and less than or equal to 5% in the electrolyte solution. Thus, by limiting the total mass of the additives within the above range, the synergistic effect between the sodium hydrosulfite and other additives may be better exerted.

In any embodiment, the electrolyte has a molar concentration of 0.8 mol/L-1.2 mol/L in the electrolyte solution. Thus, by limiting the molar concentration of the electrolyte solution within the above range, the electrolyte solution may have good conductivity and viscosity performance, and meanwhile, a secondary battery with the electrolyte solution may have an excellent initial DCR value.

In any embodiment, the solvent includes one or a combination of more of chain ester and cyclic ester. Thus, the electrolyte solution may have low viscosity and high conductivity by cooperation between the chain ester and the cyclic ester.

In any embodiment, the chain ester includes one or a combination of more of dimethyl carbonate, diethyl carbonate, ethyl methyl carbonate, methyl propyl carbonate, methyl formate, ethyl formate, methyl acetate, ethyl acetate, propyl propionate, ethyl butyrate, ethyl propionate and propyl butyrate; and/or the cyclic ester includes one or a combination of more of ethylene carbonate, propylene carbonate, butylene carbonate, γ-butyrolactone and tetrahydrofuran. Thus, by selecting the above chain ester and/or cyclic ester as an aprotic solvent, the overall performance of the secondary battery may be more effectively exerted.

A second aspect of the present application further provides a secondary battery, including: a positive plate, a negative plate, a separator and the electrolyte solution according to the first aspect of the present invention, the separator being located between the positive plate and the negative plate.

Thus, the use of the electrolyte solution with the added sodium hydrosulfite may effectively improve the performance of the secondary battery, and although a mechanism is still unclear, the reason is inferred to be that the sodium hydrosulfite may be oxidized on a positive surface and reduced on a negative surface in preference to the solvents, such as the chain ester, the cyclic ester, or the like, so as to form an interface film having low resistance at the earliest, thereby improving the performance of the secondary battery.

In any embodiment, the positive plate includes a positive material, and the positive material includes a high-nickel ternary positive active substance. Thus, the high content of Ni in the high-nickel ternary positive active substance may improve an energy density of the battery, and reduce use of cobalt, but the capability of oxidatively decomposing the solvent of the electrolyte solution by the high-nickel ternary positive active substance is enhanced as the content of Ni is increased.

In any embodiment, the Ni element has a mass percentage greater than or equal to 80% in the high-nickel ternary positive active substance. Thus, when the content of Ni in the positive electrode is defined to be greater than or equal to 80%, activity of the material may be improved, thus improving the energy density; but the substance has a high capability of oxidatively decomposing the solvent of the electrolyte solution, and at this point, the sodium hydrosulfite additive is used and may be oxidized on the positive surface in preference to the solvents, such as the chain ester, the cyclic ester, or the like, so as to form the interface film having low resistance at the earliest, thereby improving the performance of the battery.

In any embodiment, the high-nickel ternary positive active substance has the following chemical structural formula (1): $Li_{1+y}Ni_aCo_bMe_{1-a-b}O_{2-z}A_z$ formula (1), wherein $-0.1 \le y \le 0.2$, $0.5 < a < 0.9$, $0 < b < 0.5$, $0.5 < a+b < 1$, and $0 \le z < 0.2$; Me is one or more selected from Mn, Fe, Cr, Ti, Zn, V, Al, Zr and Ce; and A is one or more selected from S, N, F, Cl, Br and I. Due to selection of the high-nickel ternary positive active substance with the above chemical structural formula (1), the activity of the material may be improved, thus improving the energy density; but the substance has a high capability of oxidatively decomposing the solvent of the electrolyte solution, and therefore, the performance of the battery is improved by using the sodium hydrosulfite additive which may be oxidized on the positive surface in preference to the solvents, such as the chain ester, the cyclic ester, or the like, so as to form the interface film having low resistance at the earliest.

In any embodiment, the positive material has a specific surface area BET ranging from 0.15 m$^2$/g to 0.75 m$^2$/g. Thus, by limiting the specific surface area BET of the positive material within this range, the secondary battery may have a good dynamic performance and a long life.

In any embodiment, the negative plate includes a negative material, and the negative material includes one or a combination of more of natural graphite, artificial graphite, mesophase carbon micro beads, hard carbon, soft carbon, an oxide of silicon, a silicon-carbon composite, a Li—Sn alloy, a Li—Sn—O alloy, Sn, SnO, SnO$_2$, a lithium compound of a spinel structure and a Li—Al alloy. Thus, the above negative material has high activity, but has a high capability of reductively decomposing the solvent of the electrolyte solution.

In any embodiment, the negative material has a specific surface area BET ranging from 0.8 m$^2$/g to 1.5 m$^2$/g. Thus, the negative material has high activity when the specific surface area BET thereof is within the above numerical range, but has a high capability of reductively decomposing the solvent of the electrolyte solution, and at this point, the sodium hydrosulfite additive is used and may be reduced on the negative surface in preference to the solvents, such as the chain ester, the cyclic ester, or the like, so as to form the interface film having the low resistance at the earliest, thereby improving the performance of the battery.

In any embodiment, the secondary battery has an upper use limit voltage greater than or equal to 4.15V. Thus, the secondary battery with the upper limit voltage within this range has characteristics of a high capacity and high oxidability. Due to combined use of the sodium hydrosulfite and the positive material in the present application, advantages of the ternary positive material may be better exerted; that is, a high-temperature storage performance and a high-rate discharge capability are improved, and the initial DCR is reduced.

A third aspect of the present application provides a battery module, including the secondary battery according to the second aspect of the present application.

A fourth aspect of the present application provides a battery pack, including the battery module according to the third aspect of the present application.

A fifth aspect of the present application provides an electric device, including at least one of the secondary battery according to the second aspect of the present application, the battery module according to the third aspect of the present application, and the battery pack according to the fourth aspect of the present application.

Compared with a prior art, the present invention has the following beneficial effects.

In the electrolyte solution according to the present invention, the use of the sodium hydrosulfite as the additive of the electrolyte solution of the secondary battery may reduce the initial DCR and storage gas production of the battery and improve the rate performance. Although the mechanism is still unclear, the reason is inferred to be that valence of the S element in the sodium hydrosulfite is +3, i.e., intermediate valence of the S element, and the S element having this valence usually has high activity. Therefore, the sodium hydrosulfite may be reduced on the negative surface at the earliest, the interface film formed by reduction has the low-resistance effect, and meanwhile, the sodium hydrosulfite may be also oxidized on the positive surface at the earliest, and the interface film formed by oxidization also has the low-resistance effect, thereby improving the overall performance of the secondary battery.

Figure 1:
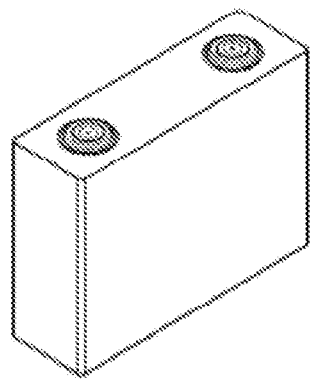
FIG. 1 is a schematic diagram of a secondary battery according to an embodiment in accordance with the present application.

REFERENCE NUMERALS 1, battery pack; 2, upper box; 3, lower box; 4, battery module; 5, secondary battery; 51, housing; 52, electrode assembly; 53, top cover assembly

DETAILED DESCRIPTION OF EMBODIMENTS

Hereinafter, embodiments which specifically disclose an electrolyte solution, a secondary battery, a battery module, a battery pack and an electric device according to the present application will be described in detail with reference to the accompanying drawings as appropriate. However, unnecessary detailed descriptions may be omitted in some cases. For example, detailed descriptions of well-known matters and repetitive descriptions of actually same structures may be omitted. This is for avoiding unnecessary and redundant description in the following, and facilitating the understanding of the person skilled in the art. Furthermore, the drawings and the following description are provided for those skilled in the art to fully understand the present application, and are not intended to limit the subject matter recited in the claims.

A "range" disclosed herein is defined in terms of lower and upper limits, with a given range being defined by selecting one lower limit and one upper limit which define boundaries of the particular range. The ranges defined in this way may be inclusive or exclusive, and may be arbitrarily combined; that is, any lower limit may be combined with any upper limit to form a range. For example, if ranges of 60-120 and 80-110 are listed for a particular parameter, it is understood that ranges of 60-110 and 80-120 are also contemplated. Furthermore, if listed minimum range values are 1 and 2, and listed maximum range values are 3, 4, and 5, the following ranges are all contemplated: 1-3, 1-4, 1-5, 2-3, 2-4, and 2-5. In the present application, unless stated otherwise, a numerical range of "a-b" represents a shorthand representation of any combination of real numbers between a and b, both a and b being real numbers. For example, a numerical range of "0-5" indicates that all real numbers between "0 and 5" are listed herein, and "0-5" is only a shorthand representation of a combination of these numbers. In addition, when a parameter is expressed to be an integer greater than or equal to 2, the expression equivalently discloses that the parameter is, for example, an integer of 2, 3, 4, 5, 6, 7, 8, 9, 10, 11, 12, or the like.

All embodiments provided herein may be combined with each other to form new technical solutions, unless otherwise specified.

All technical features provided herein may be combined with each other to form new technical solutions, unless otherwise specified.

All steps described herein may be performed sequentially or randomly, preferably sequentially, unless otherwise specified. For example, the method includes steps (a) and (b), which means that the method may include steps (a) and (b) performed sequentially or steps (b) and (a) performed sequentially. For example, the expression that the method may further include step (c) means that step (c) may be added to the method in any order; for example, the method may include steps (a), (b) and (c), or steps (a), (c) and (b), or steps (c), (a) and (b), or the like.

The terms "include" and "contain" mentioned herein are either open or closed, unless otherwise specified. For example, the terms "include" and "contain" may mean that additional components not listed may also be included or contained, or only listed components may be included or contained.

In the present application, the term "or" is inclusive, unless otherwise specified. For example, the phrase "A or B" means "A, B, or both A and B". More specifically, any one of the following conditions satisfies the condition "A or B": A is true (or present) and B is false (or not present); A is false (or not present) and B is true (or present); or both A and B are true (or present).

Electrolyte Solution

One embodiment in accordance with the present application provides an electrolyte solution, and the electrolyte solution plays a role of conducting ions between a positive plate and a negative plate. The electrolyte solution includes an electrolyte, a solvent and an additive, the additive including sodium hydrosulfite.

In a prior art, a chemical property of the sodium hydrosulfite is mainly used to adsorb oxygen, the sodium hydrosulfite is used as an additive of positive slurry, and a good electrochemical effect of the sodium hydrosulfite is not found before the present application. In the present application, the adoption of the solution that the additive includes the sodium hydrosulfite and is mixed with the electrolyte and the solvent to obtain the electrolyte may reduce initial DCR and storage gas production of a battery, and improve a rate performance. Although a mechanism is still ambiguous, the reason is inferred to be that valence of the S element in the sodium hydrosulfite is +3, i.e., intermediate valence of the S element, and the S element having this valence usually has high activity. Therefore, the sodium hydrosulfite may be reduced on a negative surface at the earliest, an interface film formed by reduction has a low-resistance effect, and meanwhile, the sodium hydrosulfite may be also oxidized on a positive surface at the earliest, and an interface film formed by oxidization also has a low-resistance effect, thereby improving an overall performance of the secondary battery.

[Additive]

In some embodiments, a mass percentage of the sodium hydrosulfite in the electrolyte solution may be, for example, greater than 0 and less than or equal to 0.5%, 0.001%-0.1%, 0.1%-0.2%, 0.2%-0.4%, 0.4%-0.5%, 0.001%-0.15%, 0.015%-0.25%, 0.25%-0.35%, 0.35%-0.5%, or the like. Optionally, the sodium hydrosulfite has a mass percentage of 0.2%-0.4% in the electrolyte solution; further optionally, the sodium hydrosulfite has a mass percentage of 0.25%-0.35% in the electrolyte solution. Thus, limitation of the quantity of the sodium hydrosulfite additive within the above range may avoid deterioration of viscosity of the electrolyte solution of the secondary battery possibly caused by excessive sodium hydrosulfite, and meanwhile avoid deterioration of initial DCR caused by excessive participation of the sodium hydrosulfite in film formation on the positive and negative surfaces. Therefore, by limiting the quantity of the sodium hydrosulfite additive within the above range, the secondary battery may have low initial DCR, low high-temperature storage gas production, and an excellent discharge rate performance.

In some embodiments, usually, other additives may be contained in addition to the sodium hydrosulfite. For example, the additive may further include one or a combination of more of 1,3-propane sultone, fluoroethylene carbonate, ethylene sulfate, or the like. Thus, performances of the secondary battery, such as storage gas production, the rate performance, or the like, are further improved by a synergistic effect between the sodium hydrosulfite and one or more of the 1,3-propane sultone, the fluoroethylene carbonate, ethylene sulfate, or the like.

In some embodiments, a total mass percentage of the additives in the electrolyte solution may be, for example, greater than 0 and less than or equal to 5%, 0.001%-1%, 1%-2%, 2%-3%, 3%-4%, 4%-5%, 0.001%-2%, 2%-5%, or the like. Thus, by limiting the total mass of the additives within the above range, the sodium hydrosulfite and other additives may have a better synergistic effect, thus improving various performances of the secondary battery, and particularly avoiding deterioration of the initial DCR caused by excessive participation of the additive in film formation on the positive and negative surfaces.

[Electrolyte]

In some embodiments, the electrolyte may have a molar concentration of 0.8 mol/L-1.2 mol/L, 0.8 mol/L-1.0 mol/L, 1.0 mol/L-1.2 mol/L, 0.8 mol/L-0.9 mol/L, 0.9 mol/L-1.0 mol/L, 1.0 mol/L-1.1 mol/L, 1.1 mol/L-1.2 mol/L, or the like. Thus, by limiting the molar concentration of the electrolyte solution within the above range, the electrolyte solution of the secondary battery may have good conductivity and viscosity performance, and meanwhile, a secondary battery with the electrolyte solution may have an excellent initial DCR value.

In some embodiments, the electrolyte includes lithium salt. Specifically, the electrolyte includes one or a combination of more of $LiPF_6$, $LiBF_4$, LiBOB, LiDFOB, $LiSO_3CF_3$, $LiClO_4$, $LiAsF_6$, $Li(FSO_2)_2N$, $Li(CF_3SO_2)_2N$, $LiC(CF_3SO_2)_3$, or the like. Optionally, the lithium salt may be $LiPF_6$ and $Li(FSO_2)_2N$.

In some embodiments, the lithium salt may have a concentration of 0.8 mol/L-1.2 mol/L, 0.8 mol/L-1.0 mol/L, 1.0 mol/L-1.2 mol/L, 0.8 mol/L-0.9 mol/L, 0.9 mol/L-1.0 mol/L, 1.0 mol/L-1.1 mol/L, 1.1 mol/L-1.2 mol/L, or the like. By limiting the concentration of the lithium salt within this range, the following situations may be avoided: an excessively low concentration of the lithium salt results in a small number of lithium ions provided in the solution, which does not facilitate diffusion of the lithium ions, causing lowered conductivity of the electrolyte solution; an excessively high concentration of the lithium salt results in high viscosity of the solution, which does not facilitate transport of the lithium ions, resulting in lowered conductivity. That is, the conductivity and viscosity of the electrolyte solution may be thus improved.

[Solvent]

In some embodiments, a type of the solvent is not particularly limited, and may be selected according to actual requirements. The solvent may include, for example, an organic solvent, and further, the solvent may include one or a combination of more of chain ester and cyclic ester. Usually, the cyclic ester has a large dielectric constant and may well dissociate the electrolyte (lithium salt), but the cyclic ester solvent has large viscosity, and the chain ester has low viscosity, such that the electrolyte solution may have low viscosity and high conductivity by combined use of the cyclic ester and the cyclic ester.

In some embodiments, from the standpoint of a solvent system well suitable for the secondary battery, the chain ester includes one or a combination of more of dimethyl carbonate, diethyl carbonate, ethyl methyl carbonate, methyl propyl carbonate, methyl formate, ethyl formate, methyl acetate, ethyl acetate, propyl propionate, ethyl butyrate, ethyl propionate and propyl butyrate; and/or the cyclic ester includes one or a combination of more of ethylene carbonate (1,3-dioxolan-2-one, 1,3-dioxocyclopentanone) (CAS No.: 96-49-1), propylene carbonate (propanediol carbonate, 1,2-propanediol carbonic acid, 4-methyl-1,3-dioxolan-2-one) (CAS No.: 108-32-7), butylene carbonate (carbonic acid-2,3-butanediol ester, 2,3-Butylene carbonate) (CAS No.: 4437-85-8), γ-butyrolactone and tetrahydrofuran.

In some embodiments, the electrolyte solution according to the first aspect of the present invention may be prepared using a method well known in the art; for example, the electrolyte, the solvent and the additive in a specific ratio may be mixed uniformly.

In some embodiments, the present application proposes the use of the electrolyte solution according to the first aspect of the present invention in the field of secondary battery fabrication.

In addition, the secondary battery, the battery module, the battery pack and the electric device according to the present invention will be described below with reference to the drawings as appropriate.

Secondary Battery

One embodiment in accordance with the present application provides a secondary battery.

Usually, the secondary battery includes a positive plate, a negative plate, a separator and the electrolyte solution according to the first aspect of the present invention. During charging and discharging processes of the battery, active ions are inserted and extracted back and forth between the positive plate and the negative plate. The electrolyte solution plays a role of conducting ions between the positive plate and the negative plate. The separator is provided between a positive plate and a negative plate, mainly functions to prevent a short circuit of the positive electrode and the negative electrode, and meanwhile may allow the ions to pass.

[Positive Plate]

The positive plate includes a positive current collector and a positive film provided on at least one surface of the positive current collector, the positive film including a positive material.

As an example, the positive current collector has two surfaces opposite in a thickness direction thereof, and the positive film is provided on one or both of the two opposite surfaces of the positive current collector.

In some embodiments, metal foil or a composite current collector may be used as the positive current collector. For example, aluminum foil may be used as the metal foil. The composite current collector may include a high molecular material base layer and a metal layer formed on at least one surface of the high molecular material base layer. The composite current collector may be formed by forming a metal material (aluminum, an aluminum alloy, nickel, a nickel alloy, titanium, a titanium alloy, silver, a silver alloy, or the like) on the base material of the high molecular material (such as polypropylene (PP), polyethylene terephthalate (PET), polybutylene terephthalate (PBT), polystyrene (PS), polyethylene (PE), or the like).

In some embodiments, the positive material may be a positive material for a battery well known in the art. As an example, the positive material may include at least one of the following materials: lithium-contained phosphate of an olivine structure, lithium transition metal oxide and respective modified compounds thereof. However, the present application is not limited to these materials, and other conventional materials which may be used as the positive material of the battery may be used. Only one of these positive materials may be used, or more than two thereof are used in combination. Examples of the lithium transition metal oxide may include, but are not limited to, at least one of lithium cobalt oxide (for example, $LiCoO_2$), lithium nickel oxide (for example, $LiNiO_2$), lithium manganese oxide (for example, $LiMnO_2$, $LiMn_2O_4$), lithium nickel cobalt oxide, lithium manganese cobalt oxide, lithium nickel manganese oxide, lithium nickel cobalt manganese oxide (for example, $LiNi_{1/3}Co_{1/3}Mn_{1/3}O_2$ (also abbreviated as $NCM_{333}$), $LiNi_{0.5}Co_{0.2}Mn_{0.3}O_2$ (also abbreviated as $NCM_{523}$), $LiNi_{0.5}Co_{0.25}Mn_{0.25}O_2$ (also abbreviated as $NCM_{211}$), $LiNi_{0.6}Co_{0.2}Mn_{0.2}O_2$ (also abbreviated as $NCM_{622}$), $LiNi_{0.8}Co_{0.1}Mn_{0.1}O_2$ (also abbreviated as $NCM_{811}$), lithium nickel cobalt aluminum oxide (for example, $LiNi_{0.85}Co_{0.15}Al_{0.05}O_2$), and modified compounds thereof, or the like. Examples of the lithium-contained phosphate of an olivine structure may include, but are not limited to, at least one of lithium iron phosphate (for example, LiFePO$_4$ (also abbreviated as LFP)), a composite material of lithium iron phosphate and carbon, lithium manganese phosphate (for example, LiMnPO$_4$), a composite material of lithium manganese phosphate and carbon, lithium iron manganese phosphate, and a composite material of lithium iron manganese phosphate and carbon. Optionally, the positive material includes a high-nickel ternary positive active substance. The high-nickel ternary positive active substance with a high Ni content may improve material activity, thus increases an energy density, but has a high capability of oxidatively decomposing the solvent of the electrolyte solution.

In some embodiments, in the high-nickel ternary positive active substance, a mass percentage of the Ni element may be greater than or equal to 80%, 80%-85%, 85%-90%, 90%-95%, or the like. Thus, when the content of Ni in the positive electrode is defined to be greater than or equal to 80%, the substance has a high capability of oxidatively decomposing the solvent of the electrolyte solution, and at this point, the sodium hydrosulfite additive is used and may be oxidized on the positive surface in preference to the solvents, so as to form the interface film having low resistance, thereby improving the overall performance of the battery.

In some embodiments, the high-nickel ternary positive active substance has the following chemical structural formula (1): $Li_{1+y}Ni_aCo_bMe_{1-a-b}O_{2-z}A_z$ formula (1); usually, y may satisfy −0.1≤y≤0.2, −0.1≤y≤0, 0≤y≤0.1, 0.1≤y≤0.2, −0.1≤y≤−0.05, −0.05≤y≤0, 0≤y≤0.05, 0.05≤y≤0.1, 0.1≤y≤0.15, 0.15≤y≤0.2, or the like. Usually, a may satisfy 0.5<a<0.9, 0.5<a<0.7, 0.7<a<0.9, 0.5<a<0.6, 0.6<a<0.7, 0.7<a<0.8, 0.8<a<0.9, or the like. Usually, b may satisfy 0<b<0.5, 0<b<0.1, 0.1<b<0.2, 0.2<b<0.3, 0.3<b<0.4, 0.4<b<0.5, 0<b<0.3, 0.3<b<0.5, or the like. Usually, a+b may satisfy 0.5<a+b<1, 0.5<a+b<0.8, 0.8<a+b<1, 0.5<a+b<0.6, 0.6<a+b<0.7, 0.7<a+b<0.8, 0.8<a+b<0.9, 0.9<a+b<1, or the like. Usually, z may satisfy 0<z<0.2, 0<z<0.1, 0.1<z<0.2, 0<z<0.05, 0.05<z<0.1, 0.1<z<0.15, 0.15<z<0.2, or the like. Me is one or more selected from Mn, Fe, Cr, Ti, Zn, V, Al, Zr and Ce. Me may be Mn or Al. A is one or more selected from S, N, F, Cl, Br and I. Optionally, A is selected from S, N and F. Thus, due to selection of the high-nickel ternary positive active substance with the above chemical structural formula (1), the substance has a high capability of oxidatively decomposing the solvent of the electrolyte solution, and the overall performance of the battery is improved by using the sodium hydrosulfite additive which may be oxidized on the positive surface in preference to the solvents, such as the chain ester, the cyclic ester, or the like, so as to form the interface film having low resistance at the earliest.

In some embodiments, a specific surface area BET of the positive material is required to satisfy a certain range, and the range of the specific surface area BET of the positive material may be, for example, 0.15 m$^2$/g-0.75 m$^2$/g, 0.15 m$^2$/g-0.45 m$^2$/g, 0.45 m$^2$/g-0.75 m$^2$/g, 0.15 m$^2$/g-0.25 m$^2$/g, 0.25 m$^2$/g-0.35 m$^2$/g, 0.35 m$^2$/g-0.45 m$^2$/g, 0.45 m$^2$/g-0.55 m$^2$/g, 0.55 m$^2$/g-0.65 m$^2$/g, 0.65 m$^2$/g-0.75 m$^2$/g, or the like. Thus, by limiting the specific surface area BET of the positive material within this range, the secondary battery may have a good dynamic performance and a long cycle life.

In some embodiments, the positive film further optionally includes a binder. As an example, the binder may include at least one of polyvinylidene fluoride (PVDF), polytetrafluoroethylene (PTFE), a vinylidene fluoride-tetrafluoroethylene-propylene terpolymer, a vinylidene fluoride-hexafluoropropylene-tetrafluoroethylene terpolymer, a tetrafluoroethylene-hexafluoropropylene copolymer, and fluorine-contained acrylate resin.

In some embodiments, the positive film further optionally includes a conductive agent. As an example, the conductive agent may include at least one of superconducting carbon, acetylene black, carbon black, Ketjen black, carbon dots, carbon nanotubes, graphene, and carbon nanofibers.

In some embodiments, the positive plate may be fabricated by: dispersing the above components for fabricating the positive plate, such as the positive material, the conductive agent, the binder, and any other component, in a solvent (for example, N-methyl pyrrolidone) to form positive slurry; and coating the positive current collector with the positive slurry, and performing drying, cold pressing and other processes to obtain the positive plate.

[Negative Plate]

The negative plate includes a negative current collector and a negative film provided on at least one surface of the negative current collector, the negative film including a negative material.

As an example, the negative current collector has two surfaces opposite in a thickness direction thereof, and the negative film is provided on one or both of the two opposite surfaces of the negative current collector.

In some embodiments, metal foil or a composite current collector may be used as the negative current collector. For example, copper foil may be used as the metal foil. The composite current collector may include a high molecular material base layer and a metal layer formed on at least one surface of the high molecular material base layer. The composite current collector may be formed by forming a metal material (copper, a copper alloy, nickel, a nickel alloy, titanium, a titanium alloy, silver, a silver alloy, or the like) on the high molecular material base layer (such as polypropylene (PP), polyethylene terephthalate (PET), polybutylene terephthalate (PBT), polystyrene (PS), polyethylene (PE), or the like).

In some embodiments, the negative material may be a negative material for a battery well known in the art. As an example, the negative material includes one or a combination of more of natural graphite, artificial graphite, mesophase carbon micro beads, hard carbon, soft carbon, an oxide of silicon, a silicon-carbon composite, a Li—Sn alloy, a Li—Sn—O alloy, Sn, SnO, SnO$_2$, a lithium compound of a spinel structure and a Li—Al alloy. It should be further noted that a molecular formula of the oxide of silicon may be SiO$_x$, and x is 0.5-2. The lithium compound of a spinel structure may be, for example, TiO$_2$—Li$_4$Ti$_5$O$_{12}$. Thus, the above negative material has high activity, and has a high capability of reductively decomposing the solvent of the electrolyte solution, such that the secondary battery may have better and excellent technical effects. Only one of these negative materials may be used, or more than two thereof are used in combination. Optionally, the negative material includes one or a combination of artificial graphite and natural graphite.

In some embodiments, a range of a specific surface area BET of the negative material may be 0.8 m$^2$/g-1.5 m$^2$/g, 0.8 m$^2$/g-1.0 m$^2$/g, 1.0 m$^2$/g-1.2 m$^2$/g, 1.2 m$^2$/g-1.5 m$^2$/g, 0.5 m$^2$/g-0.9 m$^2$/g, 0.9 m$^2$/g-1.0 m$^2$/g, 1.0 m$^2$/g-1.1 m$^2$/g, 1.1 m$^2$/g-1.2 m$^2$/g, 1.2 m$^2$/g-1.3 m$^2$/g, 1.3 m$^2$/g-1.4 m$^2$/g, 1.4 m$^2$/g-1.5 m$^2$/g, or the like. Thus, by limiting the specific surface area BET of the negative material within the above numerical range, activity of the material may be improved, but the negative material has an increased capability of reductively decomposing the solvent of the electrolyte solution as the activity of the negative material is increased, and at this point, the sodium hydrosulfite additive is used and may be reduced on the negative surface in preference to the solvents, such as the chain ester, the cyclic ester, or the like, so as to form the interface film having the low resistance at the earliest, thereby improving the overall performance of the battery.

In some embodiments, the negative film further optionally includes a binder. The binder may be at least one of styrene butadiene rubber (SBR), polyacrylic acid (PAA), sodium polyacrylate (PAAS), polyacrylamide (PAM), polyvinyl alcohol (PVA), sodium alginate (SA), polymethacrylic acid (PMAA), carboxymethyl chitosan (CMCS), and sodium carboxymethyl cellulose (CMC-Na).

In some embodiments, the negative film further optionally includes a conductive agent. The conductive agent may be at least one of superconducting carbon, acetylene black, carbon black, Ketjen black, carbon dots, carbon nanotubes, graphene, and carbon nanofibers.

In some embodiments, the negative film may further optionally include other additives, such as a thickener (for example, sodium carboxymethyl cellulose (CMC-Na)), or the like.

In some embodiments, the negative plate may be fabricated by: dispersing the above components for fabricating the negative plate, such as the negative material, the conductive agent, the binder, and any other component, in a solvent (for example, deionized water) to form negative slurry; and coating the negative current collector with the negative slurry, and performing drying, cold pressing and other processes to obtain the negative plate.

[Separator]

In some embodiments, the secondary battery further includes a separator. A type of the separator is not particularly limited in the present application, and any well-known separator with a porous structure having good chemical stability and mechanical stability may be selected.

In some embodiments, the separator may be made of at least one of glass fibers, non-woven fabrics, polyethylene, polypropylene and polyvinylidene difluoride. The separator may be a single-layer film or a multi-layer composite film, which is not particularly limited. When the separator is a multi-layer composite film, respective layers may be made of same or different materials, which is not particularly limited.

In some embodiments, there exist some requirements for an upper use limit of the secondary battery; for example, the secondary battery may have an upper use limit voltage greater than or equal to 4.15V. Generally, there is no specific requirement for a maximum value of the upper limit voltage, and in some embodiments, the upper use limit voltage of the secondary battery may be, for example, 4.15V-5V, 4.15V-4.5V, 4.5V-5V, or the like. Thus, the secondary battery with the upper limit voltage within the above range usually has characteristics of a high capacity and high oxidability. Due to use of the sodium hydrosulfite in combination with the positive material in the present application, advantages of the ternary positive material may be better exerted; that is, a high-temperature storage performance and a high-rate discharge capability are improved, and the initial DCR is reduced. When the upper use limit voltage of the secondary battery is 4.15V or more, the additive functions well.

In some embodiments, the positive plate, the negative plate and the separator may be manufactured into an electrode assembly with a winding process or a lamination process.

In some embodiments, the secondary battery may include an outer package. The outer package may be configured to encapsulate the electrode assembly and the electrolyte.

In some embodiments, the outer package of the secondary battery may be a hard shell, such as a hard plastic shell, an aluminum shell, a steel shell, or the like. The outer package of the secondary battery may also be a soft package, such as a bag-type soft package. The soft package may be made of plastic, such as polypropylene, polybutylene terephthalate, polybutylene succinate, or the like.

A shape of the secondary battery is not particularly limited in the present application, and may be a cylindrical shape, a square shape, or any other shape. For example, FIG. 1 shows a secondary battery 5 of a square structure as an example.

Figure 2:
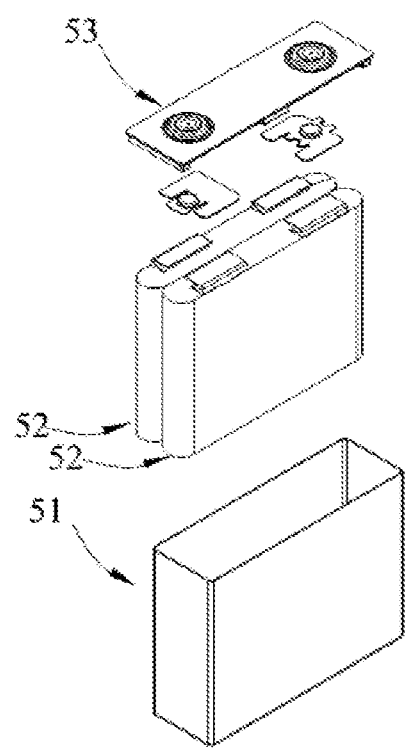
FIG. 2 is an exploded view of the secondary battery according to the embodiment in accordance with the present application shown in FIG. 1.

In some embodiments, referring to FIG. 2, the outer package may include a housing 51 and a cover plate 53. The housing 51 may include a bottom plate and a side plate connected to the bottom plate, and the bottom plate and the side plate enclose an accommodating cavity. The housing 51 has an opening communicated with the accommodating cavity, and the cover plate 53 may cover the opening to close the accommodating cavity. The positive plate, the negative plate and the separator may form the electrode assembly 52 with a winding process or a lamination process. The electrode assembly 52 is encapsulated within the accommodating cavity. The electrolyte immerses the electrode assembly 52. One or more electrode assemblies 52 may be contained in the secondary battery 5, and those skilled in the art may make a choice according to specific practical requirements.

Battery Module

In some embodiments, the secondary batteries may be assembled into a battery module, one or more secondary batteries may be contained in the battery module, and the specific number may be selected by those skilled in the art according to an application and a capacity of the battery module.

Figure 3:
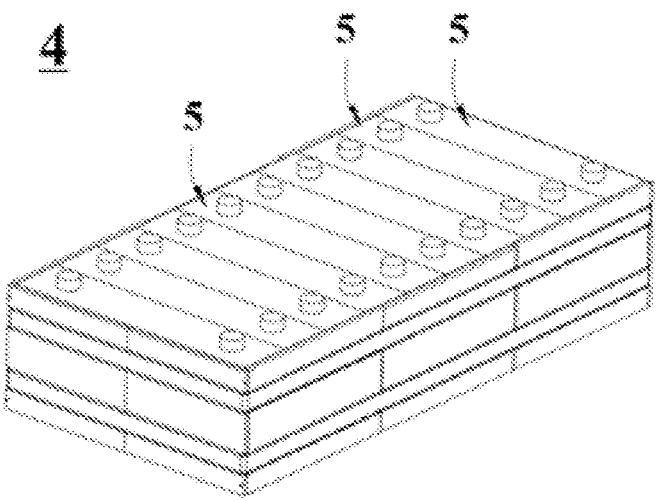
FIG. 3 is a schematic diagram of a battery module according to an embodiment in accordance with the present application.

FIG. 3 shows a battery module 4 as an example. Referring to FIG. 3, a plurality of secondary batteries 5 may be sequentially arranged in the battery module 4 in a length direction of the battery module 4. Certainly, the secondary batteries 5 may be arranged in any other way. The plurality of secondary batteries 5 may be further fixed by fasteners.

Optionally, the battery module 4 may further include a casing having an accommodating space in which the plurality of secondary batteries 5 are accommodated.

Battery Pack

In some embodiments, the above-mentioned battery modules may be further assembled into a battery pack, one or more battery modules may be contained in the battery pack, and the specific number may be selected by those skilled in the art according to an application and a capacity of the battery pack.

Figure 4:
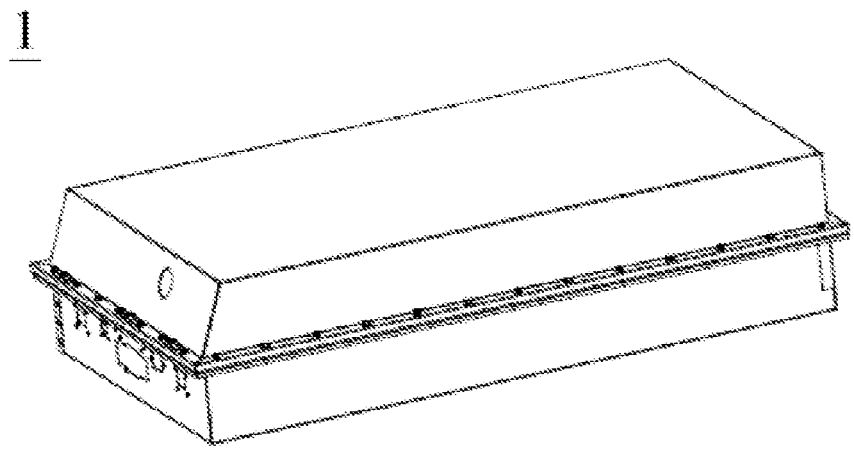
FIG. 4 is a schematic diagram of a battery pack according to an embodiment in accordance with the present application.
Figure 5:
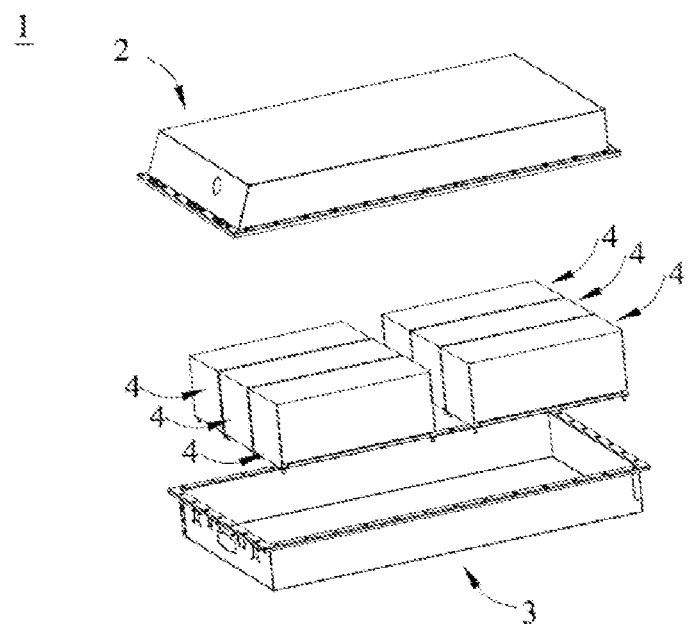
FIG. 5 is an exploded view of the battery pack according to the embodiment in accordance with the present application shown in FIG. 4.

FIGS. 4 and 5 show a battery pack 1 as an example. Referring to FIGS. 4 and 5, the battery pack 1 may include a battery box and a plurality of battery modules 4 arranged in the battery box. The battery box includes an upper box 2 and a lower box 3, and the upper box 2 may cover the lower box 3 to form an enclosed space for accommodating the battery module 4. The plurality of battery modules 4 may be arranged in the battery box in any manner.

Electric Device

In addition, the present application further provides an electric device, including at least one of the secondary battery, the battery module and the battery pack according to the present application. The secondary battery, the battery module, or the battery pack may be used as a power source or an energy storage unit of the electric device. The electric device may include, but is not limited to, a mobile apparatus (for example, a mobile phone, a notebook computer, or the like), an electric vehicle (for example, a battery electric vehicle, a hybrid electric vehicle, a plug-in hybrid electric vehicle, an electric bicycle, an electric scooter, an electric golf cart, an electric truck, or the like), an electric train, a ship, a satellite, an energy storage system, or the like.

The secondary battery, the battery module, or the battery pack may be selected according to use requirements of the electric device.

Figure 6:
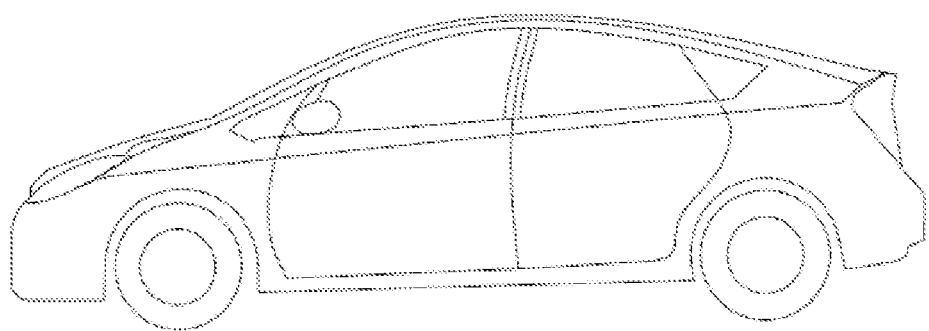
FIG. 6 is a schematic diagram of an electric device in which the secondary battery is used as a power source according to an embodiment in accordance with the present application.

FIG. 6 shows an electric device as an example. The electric device is a battery electric vehicle, a hybrid electric vehicle, a plug-in hybrid electric vehicle, or the like. In order to meet demands of the electric device for high power and high energy density of the secondary battery, a battery pack or a battery module may be used.

As another example, the device may be a mobile phone, a tablet computer, a notebook computer, or the like. Usually, the device is required to be thin and light, and a secondary battery may be used as the power source thereof.

EXAMPLE

Hereinafter, examples of the present application will be described. The examples described below are illustrative, and merely used to explain the present application. The examples shall not be construed to limit the present application. If the specific technologies or conditions are not specified in the examples, a step will be performed in accordance with the techniques or conditions described in the literature in the art or in accordance with the product instructions. The reagents or instruments used in the present invention, the manufacturers of which are not indicated, are the commercially available conventional products.

Example 1

(1) Fabrication of Positive Plate

A positive active ternary material (LiNi$_{0.8}$Co$_{0.1}$Mn$_{0.1}$O$_2$), a binder (polyvinylidene fluoride), a conductive agent (acetylene black) and N-methyl pyrrolidone (NMP) were mixed according to a weight ratio of 98:1:1:100, and the mixture was stirred under the action of a vacuum stirrer until the system was uniform and transparent to obtain positive slurry; aluminum foil with a thickness of 12 μm was uniformly coated with the positive slurry according to a single-surface coating quantity of 0.3 g/1540.25 mm$^2$; and the coated aluminum foil was aired at a room temperature, transferred to a 120° C. oven and dried for 1 h, and then, cold pressing and splitting were performed to obtain the positive plate.

(2) Fabrication of Negative Plate

Artificial graphite, a conductive agent (carbon black), a binder (sodium carboxymethyl cellulose) and deionized water were mixed according to a mass ratio of 92:2:6:100, and negative slurry was obtained under the action of the vacuum stirrer; copper foil of a negative current collector with a thickness of 8 μm was evenly coated with the negative slurry according to a single-surface coating quantity of 0.17 g/1540.25 mm$^2$; and the copper foil was aired at the room temperature, transferred to the 120° C. oven and dried for 1 h, and then, cold pressing and splitting were performed to obtain the negative plate.

(3) Separator

Cellgard corporation, with a model of cellgard2400

(4) Preparation of Electrolyte Solution

A non-aqueous organic solvent was a mixed solution containing ethylene carbonate (EC), propylene carbonate (PC) and diethyl carbonate (DEC), and EC, PC and DEC had a volume ratio of 1:1:1. In an argon atmosphere glove box with a water content less than 10 ppm, solute LiPF$_6$ was added into the above mixed solvent to obtain mother liquor containing LiPF$_6$ with a concentration of 1 mol/L, and sodium hydrosulfite with a content of 0.1% as an additive was added into the above mother liquor. In Table 1, the content of the additive is a weight percentage calculated based on a total weight of the electrolyte solution.

(5) Fabrication of Lithium Ion Secondary Battery

The positive plate, the separator and the negative plate were overlapped in sequence, the separator was located between the positive plate and the negative plate to play an isolating role, and then, the positive plate, the separator and the negative plate were wound to obtain a bare cell; the bare cell with a capacity of 4.3 Ah was placed in outer packaging foil to obtain a battery, 8.6 g of the above prepared electrolyte solution was injected into the dried fabricated battery, and vacuum encapsulation, standing, formation, shaping and other processes were performed to obtain the lithium ion secondary battery.

Example 2

For the fabrication process of the lithium ion secondary battery, reference is overall made to example 1 except that sodium hydrosulfite with a content of 0.2% as an additive was added in the preparing step of the electrolyte solution.

Example 3

For the fabrication process of the lithium ion secondary battery, reference is overall made to example 1 except that sodium hydrosulfite with a content of 0.3% as an additive was added in the preparing step of the electrolyte solution.

Example 4

For the fabrication process of the lithium ion secondary battery, reference is overall made to example 1 except that sodium hydrosulfite with a content of 0.4% as an additive was added in the preparing step of the electrolyte solution.

Example 5

For the fabrication process of the lithium ion secondary battery, reference is overall made to example 1 except that sodium hydrosulfite with a content of 0.5% as an additive was added in the preparing step of the electrolyte solution.

Example 6

For the fabrication process of the lithium ion secondary battery, reference is overall made to example 3 except that another additive was also included in the preparing step of the electrolyte solution, and the additive included 0.3% of DTD (ethylene sulfate), 0.3% of 1,3-PS (1,3-propane sultone) and 1% of FEC (fluoroethylene carbonate).

Example 7

For the fabrication process of the lithium ion secondary battery, reference is overall made to example 1 except that in the fabrication step of the positive plate, the positive active ternary material was $LiNi_{0.5}Co_{0.2}Mn_{0.3}O_2$.

Example 8

For the fabrication process of the lithium ion secondary battery, reference is overall made to example 3 except that in the fabrication step of the positive plate, the positive active ternary material was $LiNi_{0.5}Co_{0.2}Mn_{0.3}O_2$.

Example 9

For the fabrication process of the lithium ion secondary battery, reference is overall made to example 5 except that in the fabrication step of the positive plate, the positive active ternary material was $LiNi_{0.5}Co_{0.2}Mn_{0.3}O_2$.

Example 10

For the fabrication process of the lithium ion secondary battery, reference is overall made to example 7 except that another additive was also included in the preparing step of the electrolyte solution, and the additive included 0.3% of DTD (ethylene sulfate), 0.3% of 1,3-PS (1,3-propane sultone) and 1% of FEC (fluoroethylene carbonate).

Example 11

For the fabrication process of the lithium ion secondary battery, reference is overall made to example 1 except that sodium hydrosulfite with a content of 0.6% as an additive was added in the preparing step of the electrolyte solution.

Example 12

For the fabrication process of the lithium ion secondary battery, reference is overall made to example 1 except that sodium hydrosulfite with a content of 0.7% as an additive was added in the preparing step of the electrolyte solution.

Example 13

For the fabrication process of the lithium ion secondary battery, reference is overall made to example 7 except that sodium hydrosulfite with a content of 0.6% as an additive was added in the preparing step of the electrolyte solution.

Comparative Example 1

For the fabrication process of the lithium ion secondary battery, reference is overall made to example 1 except that sodium hydrosulfite was not added in the preparing step of the electrolyte solution.

Comparative Example 2

For the fabrication process of the lithium ion secondary battery, reference is overall made to example 3 except that sodium hydrosulfite accounting for 0.3% of the total mass of the positive plate was added in the fabrication process of the positive plate. Sodium hydrosulfite was not added in the preparing step of the electrolyte solution.

Comparative Example 3

For the fabrication process of the lithium ion secondary battery, reference is overall made to example 3 except that sodium hydrosulfite accounting for 0.3% of the total mass of the negative plate was added in the fabrication process of the negative plate. Sodium hydrosulfite was not added in the preparing step of the electrolyte solution.

Comparative Example 4

For the fabrication process of the lithium ion secondary battery, reference is overall made to example 7 except that sodium hydrosulfite was not added in the preparing step of the electrolyte solution.

Related parameters of the above Examples 1-13 and Comparative Examples 1-4 are shown in Table 1 below.

TABLE 1

Parameter results of Examples 1-13 and Comparative Examples 1-4

| Example | Positive material | Positive-material specific surface area BET ($m^2/g$) | Negative material | Negative-material specific surface area BET ($m^2/g$) | Adding mode of additive | Sodium hydrosulfite content | Another additive and quantity |
|---|---|---|---|---|---|---|---|
| Example 1 | $LiNi_{0.8}Co_{0.1}Mn_{0.1}O_2$ | 0.5 | Artificial graphite | 1.0 | Electrolyte solution | 0.1% | / |
| Example 2 | $LiNi_{0.8}Co_{0.1}Mn_{0.1}O_2$ | 0.5 | Artificial graphite | 1.0 | Electrolyte solution | 0.2% | / |
| Example 3 | $LiNi_{0.8}Co_{0.1}Mn_{0.1}O_2$ | 0.5 | Artificial graphite | 1.0 | Electrolyte solution | 0.3% | / |
| Example 4 | $LiNi_{0.8}Co_{0.1}Mn_{0.1}O_2$ | 0.5 | Artificial graphite | 1.0 | Electrolyte solution | 0.4% | / |
| Example 5 | $LiNi_{0.8}Co_{0.1}Mn_{0.1}O_2$ | 0.5 | Artificial graphite | 1.0 | Electrolyte solution | 0.5% | / |
| Example 6 | $LiNi_{0.8}Co_{0.1}Mn_{0.1}O_2$ | 0.5 | Artificial graphite | 1.0 | Electrolyte solution | 0.3% | 0.3% DTD + 0.3% 1,3-PS + 1% FEC |
| Example 7 | $LiNi_{0.5}Co_{0.2}Mn_{0.3}O_2$ | 0.5 | Artificial graphite | 1.0 | Electrolyte solution | 0.1% | / |
| Example 8 | $LiNi_{0.5}Co_{0.2}Mn_{0.3}O_2$ | 0.5 | Artificial graphite | 1.0 | Electrolyte solution | 0.3% | / |
| Example 9 | $LiNi_{0.5}Co_{0.2}Mn_{0.3}O_2$ | 0.5 | Artificial graphite | 1.0 | Electrolyte solution | 0.5% | / |
| Example 10 | $LiNi_{0.5}Co_{0.2}Mn_{0.3}O_2$ | 0.5 | Artificial graphite | 1.0 | Electrolyte solution | 0.3% | 0.3% DTD + 0.3% 1,3-PS + 1% FEC |

TABLE 1-continued

Parameter results of Examples 1-13 and Comparative Examples 1-4

| Example | Positive material | Positive-material specific surface area BET (m²/g) | Negative material | Negative-material specific surface area BET(m²/g) | Adding mode of additive | Sodium hydrosulfite content | Another additive and quantity |
|---|---|---|---|---|---|---|---|
| Example 11 | $LiNi_{0.8}Co_{0.1}Mn_{0.1}O_2$ | 0.5 | Artificial graphite | 1.0 | Electrolyte solution | 0.6% | / |
| Example 12 | $LiNi_{0.8}Co_{0.1}Mn_{0.1}O_2$ | 0.5 | Artificial graphite | 1.0 | Electrolyte solution | 0.7% | / |
| Example 13 | $LiNi_{0.5}Co_{0.2}Mn_{0.3}O_2$ | 0.5 | Artificial graphite | 1.0 | Electrolyte solution | 0.6% | / |
| Comparative Example 1 | $LiNi_{0.8}Co_{0.1}Mn_{0.1}O_2$ | 0.5 | Artificial graphite | 1.0 | No adding | 0% | / |
| Comparative Example 2 | $LiNi_{0.8}Co_{0.1}Mn_{0.1}O_2$ | 0.5 | Artificial graphite | 1.0 | Positive material | 0.3% | / |
| Comparative Example 3 | $LiNi_{0.8}Co_{0.1}Mn_{0.1}O_2$ | 0.5 | Artificial graphite | 1.0 | Negative material | 0.3% | / |
| Comparative Example 4 | $LiNi_{0.5}Co_{0.2}Mn_{0.3}O_2$ | 0.5 | Artificial graphite | 1.0 | No adding | 0% | / |

2. Battery Performance Test (1) 60° C. Storage Test of Lithium Ion Secondary Battery The lithium ion secondary battery was charged to 4.35V at a constant current of 0.5 C at 60° C., and then charged at a constant voltage to a current of 0.05 C, and at this point, a thickness of the lithium ion secondary battery was tested and recorded as $h_0$; then, the lithium ion secondary battery was placed in a thermostat at 60° C., stored for 30 days, and then taken out, and the thickness of the lithium ion secondary battery at this point was tested and recorded as $h_1$. A thickness expansion rate of the lithium ion secondary battery after 30-day storage=$[(h_1-h_0)/h_0]\times 100\%$.

(2) Initial DCR Performance Test of Lithium Ion Secondary Battery

The just-fabricated cell was charged to 4.35V at 1 C, then charged to 0.05 C at a constant voltage, and then discharged for 30 min at 1 C, and at this point, a voltage was V1; then, the cell was discharged for 30 s at 4 C(I), voltage values were recorded using a sampling point of 0.1 s in the discharging process of 30 s, and finally, a voltage at the end of discharge was recorded as V2, so as to obtain discharge DCR (i.e., (V1–V2)/I) of the cell with 50% SOC.

(3) 4 C Discharge Capacity Conservation Rate of Lithium Ion Secondary Battery

At 25° C., the lithium ion secondary battery was charged to 4.35V at a constant current of 1 C, then charged at a constant voltage to a current of 0.05 C, and then discharged to 2.8V at a constant current of 1 C, and a discharge capacity at this point was set as a 1 C nominal capacity and calibrated to 100%.

Then, the battery was continuously charged to 4.35V at a constant current of 1 C, charged at a constant voltage to a current of 0.05 C, and then discharged to 2.8V at a constant current of 4 C, so as to obtain a discharge capacity at this point as a 4 C discharge capacity.

4C discharge capacity conservation rate=discharge capacity/nominal capacity×100%.

3. Test Results of Examples and Comparative Examples

Test results of the above Examples 1-13 and Comparative Examples 1-4 are shown in Table 2 below.

TABLE 2

Test results of Examples 1-13 and Comparative Examples 1-4

| | 60° C. storage volume expansion rate/% | Initial DCR/mohm | 4 C discharge capacity conservation rate/% |
|---|---|---|---|
| Example 1 | 38.3 | 25.6 | 92.5 |
| Example 2 | 36.5 | 23.6 | 93.1 |
| Example 3 | 35.2 | 21.5 | 95.1 |
| Example 4 | 36.1 | 22.7 | 94.5 |
| Example 5 | 37.9 | 24.1 | 93.5 |
| Example 6 | 34.1 | 20.3 | 96.1 |
| Example 7 | 38.9 | 25.1 | 92.4 |
| Example 8 | 38.4 | 24.7 | 92.5 |
| Example 9 | 38.6 | 25.0 | 92.5 |
| Example 10 | 38.1 | 24.1 | 93.1 |
| Example 11 | 38.8 | 26.5 | 92.7 |
| Example 12 | 39.0 | 27.1 | 92.4 |
| Example 13 | 39.1 | 27.1 | 92.3 |
| Comparative Example 1 | 44.1 | 29.0 | 91.6 |
| Comparative Example 2 | 39.9 | 28 | 92.1 |
| Comparative Example 3 | 40.5 | 27.7 | 91.8 |
| Comparative Example 4 | 39.5 | 28.5 | 91.7 |

From the results in Table 2, in Examples 1-13, compared to Comparative Examples 1-4, the addition of the sodium hydrosulfite in the electrolyte solution significantly improves the 60° C. storage volume expansion rate, the initial DCR and the 4 C discharge capacity conservation rate of the lithium ion secondary battery, and excellent effects are obtained.

In addition, from the test results of Example 1, Comparative Example 1, Example 7 and Comparative Example 4, the difference is only whether the sodium hydrosulfite is added, but the battery performance of the example is significantly better than that of the comparative example.

From comparison between Example 6 and Example 3, the addition of another additive, in cooperation with the sodium hydrosulfite, reduces the 60° C. storage volume expansion rate and the initial DCR, and may properly improve the 4 C discharge capacity conservation rate.

From the test results of Example 8 and Example 3, when the positive active ternary material is $LiNi_{0.8}Co_{0.1}Mn_{0.1}O_2$, effects on the 60° C. storage volume expansion rate, the initial DCR and the 4 C discharge capacity conservation rate are relatively better than those of $LiNi_{0.5}Co_{0.2}Mn_{0.3}O_2$.

From the test results of Example 3 and Comparative Examples 2 and 3, an effect of addition of the sodium hydrosulfite to the electrolyte solution on the battery performance is significantly better than that of addition of the sodium hydrosulfite to the positive electrode or the negative electrode.

It should be noted that the present application is not limited to the above embodiments. The above-mentioned embodiments are merely examples, and embodiments having substantially the same configuration as the technical idea and exerting the same effects within the scope of the technical solution of the present application are all included in the technical scope of the present application. Furthermore, other embodiments configured by applying various modifications that can be conceived by those skilled in the art to the embodiments and combining some constituent elements in the embodiments are also included in the scope of the present application without departing from the scope of the gist of the present application.

What is claimed is:

1. A secondary battery comprising a positive plate, a negative plate, a separator, and a non-aqueous electrolyte solution, wherein the positive plate comprises a positive material, and the positive material comprises a high-nickel ternary positive active substance, the high-nickel ternary positive active substance has a chemical structural formula (1):

$$Li_{1+y}Ni_aCo_bMe_{1-a-b}O_{2-z}A_z \quad \text{formula (1), where}$$

0.1≤y≤0.2, 0.5<a<0.9, 0<b<0.5, 0.5<a+b<1, and 0≤z≤0.2;

Me is one or more selected from Mn, Fe, Cr, Ti, Zn, V, Al, Zr and Ce; and

A is one or more selected from S, N, F, Cl, Br and I, the non-aqueous electrolyte solution comprises an electrolyte, a solvent and an additive, the additive comprises sodium hydrosulfite, wherein the sodium hydrosulfite has a mass percentage greater than 0.1% and less than or equal to 0.5% in the non-aqueous electrolyte solution.

2. The secondary battery according to claim 1, wherein the sodium hydrosulfite has a mass percentage of 0.2%-0.4% in the electrolyte solution.

3. The secondary battery according to claim 1, wherein the additive further comprises one or a combination of more of 1,3-propane sultone, fluoroethylene carbonate and ethylene sulfate.

4. The secondary battery according to claim 1, wherein the additive has a total mass percentage greater than 0.1% and less than or equal to 5% in the electrolyte solution.

5. The secondary battery according to claim 1, wherein the electrolyte has a molar concentration of 0.8 mol/L-1.2 mol/L in the non-aqueous electrolyte solution.

6. The secondary battery according to claim 1, wherein the solvent comprises one or a combination of more of chain ester and cyclic ester.

7. The secondary battery according to claim 6, wherein the chain ester comprises one or a combination of more of dimethyl carbonate, diethyl carbonate, ethyl methyl carbonate, methyl propyl carbonate, methyl formate, ethyl formate, methyl acetate, ethyl acetate, propyl propionate, ethyl butyrate, ethyl propionate and propyl butyrate; and/or the cyclic ester comprises one or a combination of more of ethylene carbonate, propylene carbonate, butylene carbonate, y-butyrolactone and tetrahydrofuran.

8. The secondary battery according to claim 1, wherein Ni element has a mass percentage greater than or equal to 80% in the high-nickel ternary positive active substance.

9. The secondary battery according to claim 1, wherein the positive material has a specific surface area BET ranging from 0.15 m²/g to 0.75 m²/g.

10. The secondary battery according to claim 1, wherein the negative plate comprises a negative material, and the negative material comprises one or a combination of more of natural graphite, artificial graphite, mesophase carbon micro beads, hard carbon, soft carbon, an oxide of silicon, a silicon-carbon composite, a Li—Sn alloy, a Li—Sn—O alloy, Sn, SnO, $SnO_2$, a lithium compound of a spinel structure and a Li—Al alloy.

11. The secondary battery according to claim 10, wherein the negative material has a specific surface area BET ranging from 0.8 m²/g to 1.5 m²/g.

12. The secondary battery according to claim 1, wherein the secondary battery has an upper use limit voltage greater than or equal to 4.15V.

13. A battery module, comprising the secondary battery according to claim 1.

* * * * *